US008125711B2

(12) United States Patent
    Kimura

(10) Patent No.: US 8,125,711 B2
(45) Date of Patent: Feb. 28, 2012

(54) IMAGE BLUR CORRECTION APPARATUS, AND IMAGING APPARATUS OR OPTICAL APPARATUS EQUIPPED WITH IMAGE BLUR CORRECTION APPARATUS

(75) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 401 days.

(21) Appl. No.: 12/424,840

(22) Filed: Apr. 16, 2009

(65) Prior Publication Data

US 2009/0262425 A1    Oct. 22, 2009

(30) Foreign Application Priority Data

Apr. 16, 2008 (JP) ................. 2008-107319

(51) Int. Cl.
    *G02B 27/64* (2006.01)
    *G03B 17/00* (2006.01)
(52) U.S. Cl. ............ 359/554; 359/557; 396/55; 396/52; 396/53; 396/54; 348/208.11
(58) Field of Classification Search .................. 359/554, 359/557; 396/55, 52, 53, 54; 348/208.99, 348/208.5, 208.11
See application file for complete search history.

(56) References Cited

U.S. PATENT DOCUMENTS

| 5,376,993 | A | * | 12/1994 | Kubota et al. ............ 348/208.99 |
| 5,619,293 | A | * | 4/1997 | Usui ............................... 396/55 |
| 6,018,420 | A | | 1/2000 | Hirunuma |
| 7,920,780 | B2 | * | 4/2011 | Saito ............................. 396/55 |

FOREIGN PATENT DOCUMENTS

| JP | 2-162320 | 6/1990 |
| JP | 8-184870 | 7/1996 |
| JP | 11-167074 | 6/1999 |

* cited by examiner

*Primary Examiner* — Audrey Y Chang
(74) *Attorney, Agent, or Firm* — Canon USA Inc IP Division

(57) ABSTRACT

An image blur correction apparatus includes first and second lens units, a supporting unit aligning the first and second lens units in an optical axis direction, so that the first and second lens units can independently move in a direction perpendicular to the optical axis, a driving unit driving the first and second lens units in the direction perpendicular to the optical axis, a relative position detection unit detecting a relative position between the first and second lens units, a shake detection unit detecting a shake amount added to the image blur correction apparatus, and a control unit controlling the driving unit based on an output of the shake detection unit. The control unit performs closed-loop control based on an output of the relative position detection unit so that the second lens unit moves in a direction opposite to that of the first lens unit.

10 Claims, 13 Drawing Sheets

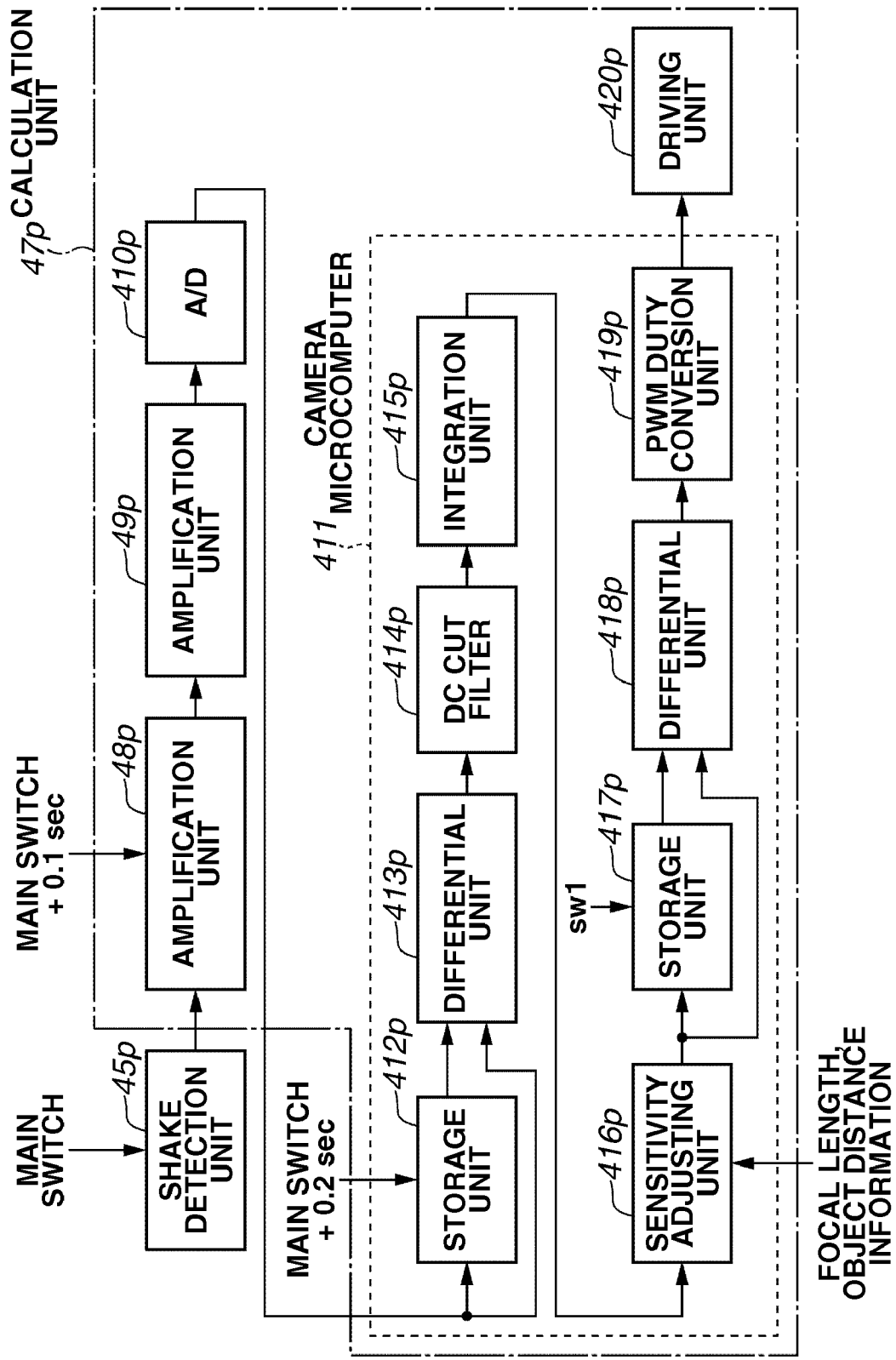

IMAGE BLUR CORRECTION APPARATUS, AND IMAGING APPARATUS OR OPTICAL APPARATUS EQUIPPED WITH IMAGE BLUR CORRECTION APPARATUS

BACKGROUND OF THE INVENTION

1. Field of the Invention

The present invention relates to an image blur correction apparatus (image stabilization apparatus) that performs image blur correction (image stabilization), and also relates to an imaging apparatus or an optical apparatus that includes the image blur correction apparatus.

2. Description of the Related Art

Recent cameras can automatically perform essential image capturing processing (e.g., exposure determination and focus adjustment) to prevent users from failing in shooting operations even if the users are not skillful for camera operations. Further, imaging systems are configured to correct image blur that may be caused by a camera shake added to cameras. Thus, there is almost nothing about factors that may induce any errors in user's shooting operations.

An example system capable of correcting image blur caused by a camera shake is simply described below. The camera shake added to a camera in a shooting operation is vibration in the frequency range from 1 Hz to 10 Hz. To capture an image free from image blur even when such a camera shake occurs when a shutter release button is pressed, it is necessary to detect a camera shake caused by camera shake and move a lens to be used for image blur correction (hereinafter, referred to as "correction lens") according to the detection value. Therefore, to capture an image free from image blur even when a camera shake occurs, it is necessary to accurately detect a camera shake (vibration) and correct a change of the optical axis caused by the camera shake.

Detection of the camera shake can be realized by a shake detection unit installed on a camera. In principle, the shake detection unit detects acceleration, angular acceleration, angular velocity, or angular displacement and performs processing for calculating an output for image blur correction. The camera system performs image blur correction based on the output of the shake detection unit.

As discussed in Japanese Patent Application Laid-Open No. 2-162320 or in Japanese Patent Application Laid-Open No. 11-167074, a conventional camera shake correction apparatus uses a pair of lenses of opposite powers and balances these lenses.

However, according to Japanese Patent Application Laid-Open No. 2-162320, a link mechanism (a beam structure) extends in an optical axis direction to hold the lenses of opposite powers in a balanced state. Therefore, the body size of the camera shake correction apparatus is relatively large. As the correction lenses are supported by beam members rotatably with respect to the beam members, camera shake correction may cause a positional deviation in the optical axis direction and may deteriorate the accuracy in the focus direction.

According to Japanese Patent Application Laid-Open No. 11-167074, the image blur correction apparatus is required for correcting each image blur of two axes and therefore the apparatus body cannot be downsized.

SUMMARY OF THE INVENTION

Exemplary embodiments of the present invention are directed to a compact and power-saving image blur correction apparatus capable of reducing a positional deviation of an image formed on an image plane, which may be caused by the weight of first and second correction lenses, and provides an imaging apparatus or an optical apparatus that includes the image blur correction apparatus.

According to an aspect of the present invention, an image blur correction apparatus includes a first lens unit including a first correction lens, a second lens unit including a second correction lens having a power opposite to that of the first correction lens, a supporting unit configured to align the first lens unit and the second lens unit in a direction of an optical axis, so that the first lens unit and the second lens unit can independently move in a direction perpendicular to the optical axis, a driving unit configured to drive the first lens unit and the second lens unit in the direction perpendicular to the optical axis, a relative position detection unit configured to detect a relative position between the first lens unit and the second lens unit, a shake detection unit configured to detect a shake amount added to the image blur correction apparatus, and a control unit configured to control the driving unit based on an output of the shake detection unit, wherein the control unit is configured to perform closed-loop control based on an output of the relative position detection unit so that the second lens unit moves in a direction opposite to that of the first lens unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 13 is a block diagram illustrating a circuit arrangement of an image blur correction system equipped in the imaging apparatus according to the present invention.

DETAILED DESCRIPTION OF THE EMBODIMENTS

Figure 1:
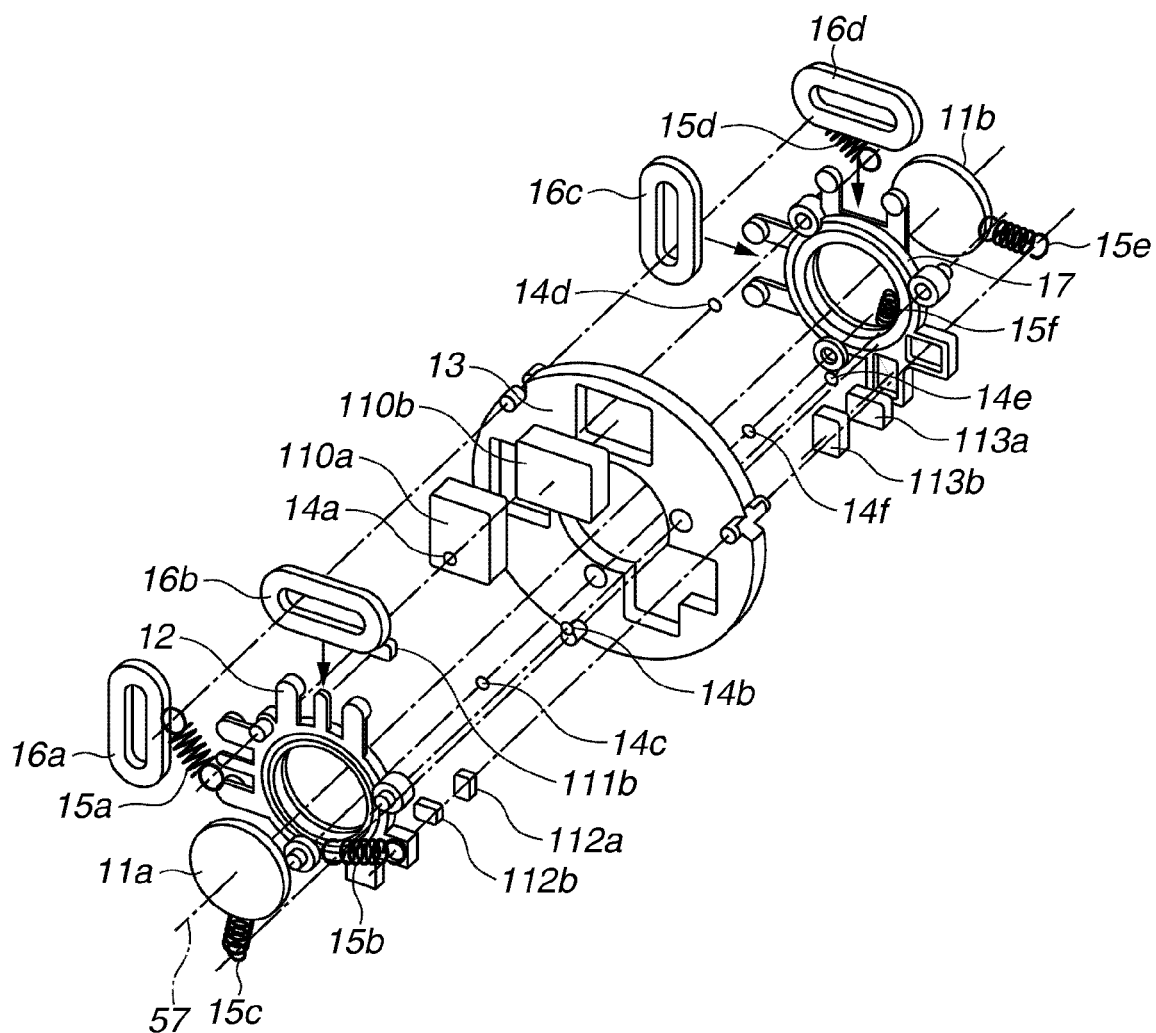
FIG. 1 is an exploded perspective view illustrating an image blur correction apparatus equipped in an imaging apparatus according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

Figure 11:
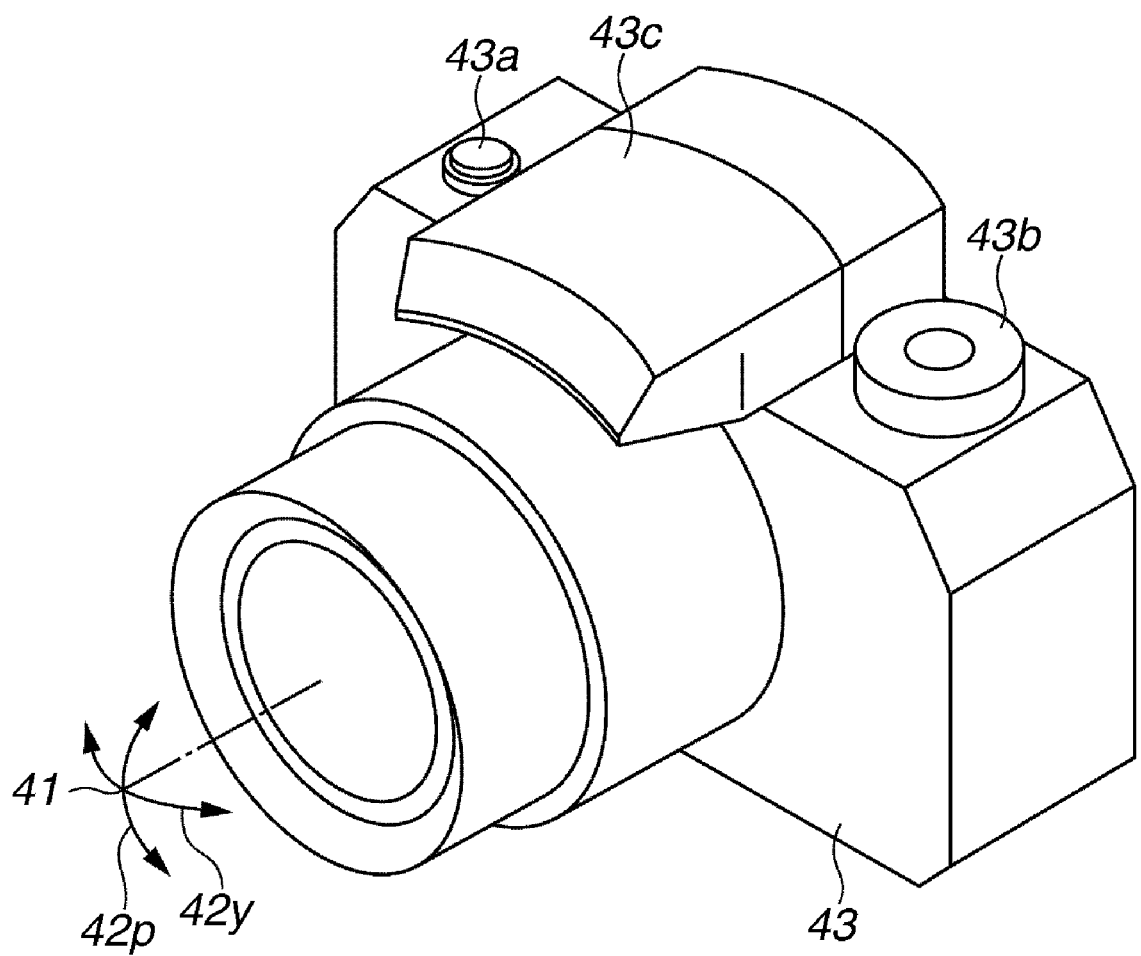
FIG. 11 illustrates an appearance of the imaging apparatus according to the present invention.

FIG. 11 illustrates an appearance of an imaging apparatus (digital camera) that has an image blur correction function according to the present invention. The imaging apparatus (digital camera) performs image blur correction when the camera is subjected to vertical and horizontal shakes indicated by arrows 42$p$ and 42$y$ with respect to an optical axis 41. A camera body 43 includes a release button 43$a$, a mode dial 43$b$ (including a main switch), and a retractable flash unit 43$c$.

Figure 12:
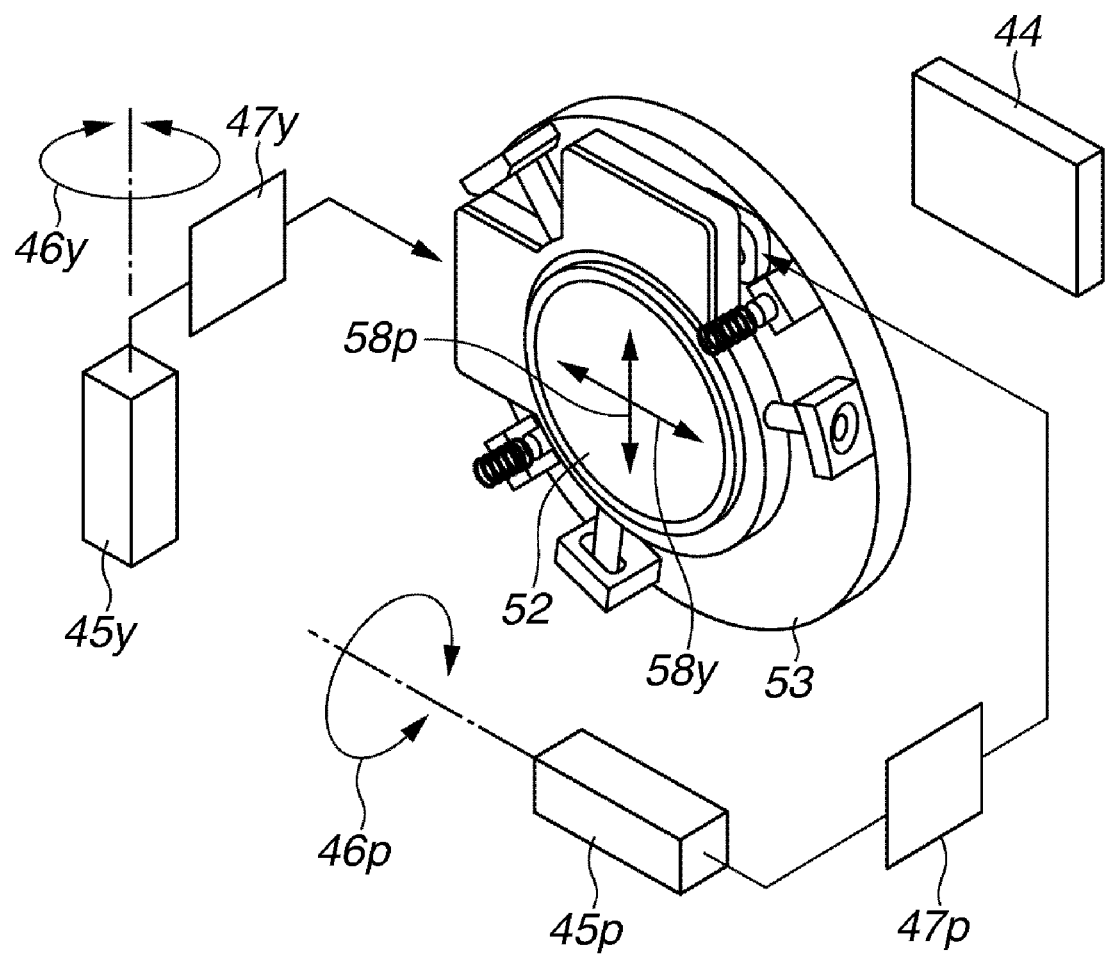
FIG. 12 schematically illustrates a perspective view of the image blur correction apparatus of an imaging apparatus according to the present invention.

FIG. 12 is a perspective view illustrating an example mechanism of the image blur correction apparatus equipped in the digital camera according to the present exemplary embodiment. An image sensor 44 converts an object image into an electric signal.

An image blur correction apparatus 53 drives a correction lens 52 in two directions indicated by arrows 58$p$ and 58$y$ and performs image blur correction in two directions respectively indicated by arrows 42$p$ and 42$y$ illustrated in FIG. 11.

A shake detection unit (e.g., an angular speed sensor or an angular acceleration sensor) 45$p$ detects a shake amount indicated by an arrow 46$p$. Another shake detection unit 45$y$ detects a shake amount indicated by an arrow 46$y$. A calculation unit 47$p$ converts an output of the shake detection unit 45$p$ into a drive target value to be supplied to the correction lens 52. Another calculation unit 47$y$ converts an output of the shake detection unit 45$y$ into a drive target value to be supplied to the correction lens 52. The image blur correction can be realized by supplying the converted drive target values to coils in the image blur correction apparatus 53.

FIG. 13 is a block diagram illustrating details of the calculation units 47$p$ and 47$y$ illustrated in FIG. 12. As the calculation units 47$p$ and 47$y$ are similar to each other, FIG. 13 illustrates an example circuit arrangement of the calculation unit 47$p$.

The calculation unit 47$p$ includes an amplification unit 48$p$, an amplification unit 49$p$, an analog-to-digital conversion unit (hereinafter, referred to as "A/D conversion unit") 410$p$, a camera microcomputer 411, and a driving unit 420$p$, which are constituent elements surrounded by an alternate long and short dash line illustrated in FIG. 13.

The camera microcomputer 411 includes a storage unit 412$p$, a differential unit 413$p$, a DC cut filter 414$p$, an integration unit 415$p$, a sensitivity adjusting unit 416$p$, a storage unit 417$p$, a differential unit 418$p$, and a PWM duty conversion unit 419$p$.

In the present invention, the shake detection unit 45$p$ is a vibration gyro that can detect a camera shake angular velocity. The vibration gyro starts its operation in synchronization with turning-on of the main switch of the camera and starts detecting a shake angular velocity applied on the camera.

The amplification unit 48$p$ removes DC bias components from a shake signal received from the shake detection unit 45$p$ and amplifies the received shake signal. The amplification unit 48$p$ has frequency characteristics capable of cutting signal components in the frequency range equal to and less than 0.1 Hz while leaving signal components in a camera shake frequency band of 1 to 10 Hz that may be applied to the camera.

However, when the characteristics capable of cutting the signal components equal to and less than 0.1 Hz is used, it takes approximately 10 seconds to completely cut the DC components after the main switch of the camera is turned on and the shake signal is started to be input from the shake detection unit 45$p$. Therefore, the time constant of the amplification unit 48$p$ is set to a smaller value for a short duration of approximately 0.1 second after the main switch of the camera is turned on. For example, the characteristics of the amplification unit 48$p$ is set to be able to cut signal components in the frequency range equal to and less than 10 Hz.

In this manner, the amplification unit 48$p$ has the characteristics capable of cutting DC components in a short period of time of approximately 0.1 second and, then, increasing the time constant to cut signal components in the frequency range equal to and less than 0.1 Hz. As a result, the amplification unit 48$p$ can prevent a shake angular velocity signal from deteriorating.

The amplification unit 49$p$ appropriately amplifies an output signal of the amplification unit 48$p$ according to an A/D resolution to cut high-frequency noises included in the shake angular velocity signal. Therefore, in a sampling operation of the shake angular velocity signal, the A/D conversion unit 410$p$ can reduce reading errors that may be caused by noises included in the shake angular velocity signal.

The A/D conversion unit 410$p$ samples an output signal of the amplification unit 49$p$. The camera microcomputer 411 receives an output signal of the A/D conversion unit 410$p$. The amplification unit 48$p$ cuts the DC bias components. However, the shake angular velocity signal amplified by the amplification unit 49$p$ may include DC bias components. Therefore, the camera microcomputer 411 cuts the DC bias components included in the output signal of the A/D conversion unit 410$p$.

For example, the storage unit 412$p$ stores a sampling value of the shake angular velocity signal when the time duration of 0.2 seconds has elapsed after the camera main switch is turned on. The differential unit 413$p$ obtains a difference between a value stored in the storage unit 412p and the present shake angular velocity signal to cut the DC components.

However, the above-described operation for cutting the DC components is rough (because the shake angular velocity signal sampled when the time duration of 0.2 seconds has elapsed after the camera main switch is turned on includes not only the DC components but also actual camera shake components). Therefore, the DC cut filter 414p in the camera microcomputer 411 completely cuts the DC components with a digital filter.

Similar to the amplification unit 48p, the DC cut filter 414p can change its time constant and gradually increase the time constant when the time duration of 0.4 seconds (=0.2 sec+0.2 sec) has elapsed after the camera main switch is turned on.

More specifically, the DC cut filter 414p has filtering characteristics capable of cutting signal components in the frequency range equal to and less than 10 Hz when the time duration of 0.2 seconds has elapsed after the main switch is turned on. The DC cut filter 414p decreases the filter cut frequency to 5 Hz → 1 Hz → 0.5 Hz → 0.2 Hz at the time intervals of 50 msec.

However, if a photographer presses a shutter release button by a half depth (i.e., turns on a switch sw1) for a light-metering/range-finding operation during the above-described operation, the photographer may immediately start a shooting operation and it is not desired to take a long time to change the time constant.

Hence, in such a case, the DC cut filter 414p interrupts the operation for changing the time constant according to shooting conditions. For example, if a light-metering result reveals that the shutter speed becomes 1/60 and the photographic focal length is 150 mm, higher accuracy in image stabilization is not required and therefore the DC cut filter 414p completes the time constant change operation when it attains the characteristics capable of cutting signal components in the frequency range equal to and less than 0.5 Hz.

More specifically, the DC cut filter 414p controls a change amount of the time constant based on a product of the shutter speed and the photographic focal length. Thus, the time for changing the time constant can be reduced and the shutter timing can be prioritized. Needless to say, if the shutter speed is higher or when the focal length is shorter, the DC cut filter 414p completes the time constant change operation when it attains the characteristics capable of cutting signal components in the frequency range equal to and less than 1 Hz. If the shutter speed is lower and the focal length is longer, the camera microcomputer 411 inhibits a shooting operation until the DC cut filter 414p completes the operation for changing the time constant to a final value.

The integration unit 415p starts integrating the output signal of the DC cut filter 414p to convert the angular velocity signal into an angle signal. The sensitivity adjusting unit 416p appropriately amplifies the integrated angle signal according to the present camera focal length and object distance information. The sensitivity adjusting unit 416p converts the amplified signal so that a driven portion of the camera shake correction apparatus can be driven by an appropriate amount according to a camera shake angle. The above-described correction is generally required when an eccentric amount of the optical axis relative to a moving amount of the driven portion changes according to a change of an imaging optical system during a zooming/focusing operation.

The camera microcomputer 411 starts driving a mechanism portion of the image blur correction apparatus (hereinafter, simply referred to as "image blur correction apparatus") when the shutter release button is half pressed. At this moment, it is desired to prevent the image blur correction apparatus from abruptly starting its operation for the image blur correction.

The storage unit 417p and the differential unit 418p can prevent such an abrupt starting of the image blur correction operation. The storage unit 417p stores a camera shake angle signal output from the integration unit 415p via the sensitivity adjusting unit 416P at timing when the shutter release button is half pressed. The differential unit 418p obtains a difference between the output signal from the integration unit 415p via the sensitivity adjusting unit 416P and the output signal of the storage unit 417p.

At first, the two signals entered to the differential unit 418p are equal with each other at the timing when the shutter release button is half pressed. Thus, an output signal (drive target value) generated by the differential unit 418p becomes zero. Then, the signal is output continuously starting from zero. The storage unit 417p has a role of setting, as an origin, an integration signal at the timing when the shutter release button is half pressed. Therefore, the storage unit 417p and the differential unit 418p can prevent the image blur correction apparatus from abruptly starting its operation.

The PWM duty conversion unit 419p receives the target value signal from the differential unit 418p. When the voltage or current applied to the coils of the image blur correction apparatus is a value corresponding to the camera shake angle, the correction lens 52 is driven according to the camera shake angle. The PWM drive is preferably usable to reduce the amount of electric power consumed in the image blur correction apparatus and to save the electric power to be supplied to the transistors driving the coils.

Hence, the PWM duty conversion unit 419p changes a coil driving duty according to the target value. For example, when the PWM has the frequency of 20 KHz, the PWM duty conversion unit 419p sets the duty to zero if the target value received from the differential unit 418p is "2048" and sets the duty to 100 if the target value is "4096." If the target value is larger than "2048" and less than "4096", the PWM duty conversion unit 419p sets the duty to an intermediate value, which is appropriately determined according to the target value. To finely determine the duty to accurately perform the image blur correction, it is desired to consider not only the target value but also the present camera shooting conditions (e.g., temperature, camera orientation, and residual battery capacity).

The driving unit 420p (e.g., a conventional PWM driver) receives an output of the PWM duty conversion unit 419p and outputs a drive signal to be applied to the coil of the image blur correction apparatus for the image blur correction. The driving unit 420p is activated at timing when the time duration of 0.2 seconds has elapsed after the shutter release button is half pressed (i.e. when the switch sw1 is turned on).

Although not illustrated in the block diagram of FIG. 13, if the photographer fully presses the shutter release button (when a switch sw2 is turned on) to cause the camera to start exposure processing, the image blur correction is continuously performed. Accordingly, the present exemplary embodiment can prevent the camera shake from deteriorating the quality of a captured image.

The image blur correction by the image blur correction apparatus continues as long as the photographer keeps the shutter release button in a half pressed state. If the photographer releases the button from the half pressed state, the storage unit 417p stops storing the output signal of the sensitivity adjusting unit 416p (i.e., goes into a sampling state). Therefore, the differential unit 418p receives the same signal from the sensitivity adjusting unit 416p and the storage unit 417p.

The output signal generated by the differential unit 418*p* becomes zero. Therefore, the image blur correction apparatus receives no drive target value and does not perform any image blur correction.

The integration unit 415*p* continues its operation for integration as long as the main switch of the camera is not turned off. If the shutter release button is again half pressed, the storage unit 417*p* newly stores an integration output (holds the signal). If the photographer turns off the main switch, the shake detection unit 45*p* stops its operation and terminates the image stabilization sequence.

If the signal of the integration unit 415*p* becomes larger than a predetermined value, the camera microcomputer 411 determines that a panning operation of the camera has been performed and changes the time constant of the DC cut filter 414*p*. For example, the camera microcomputer 411 discards the characteristics capable of cutting signal components in the frequency range equal to and less than 0.2 Hz and newly sets the characteristics capable of cutting signal components in the frequency range equal to and less than 1 Hz. Accordingly, the time constant value returns to the original value within a predetermined time.

In this case, the time constant change amount is controlled according to the output of the integration unit 415*p*. More specifically, if the output exceeds a first threshold, the characteristics capable of cutting signal components in the frequency range equal to or less than 0.5 Hz is set for the DC cut filter 414*p*. If the output exceeds a second threshold, the characteristics capable of cutting signal components in the frequency range equal to or less than 1 Hz is set for the DC cut filter 414*p*. If the output exceeds a third threshold, the characteristics capable of cutting signal components in the frequency range equal to and less than 5 Hz is set for the DC cut filter 414*p*.

When the output of the integration unit 415*p* is a very large value (e.g., when the camera is panning), the camera microcomputer 411 resets the operation of the integration unit 415*p* to prevent saturation (overflow) in calculation. According to the circuit arrangement illustrated in FIG. 13, the amplification unit 48*p* and the amplification unit 49*p* are provided in the calculation unit 47*p*. However, the amplification unit 48*p* and the amplification unit 49*p* may be provided in the shake detection unit 45*p*.

Figure 2A:
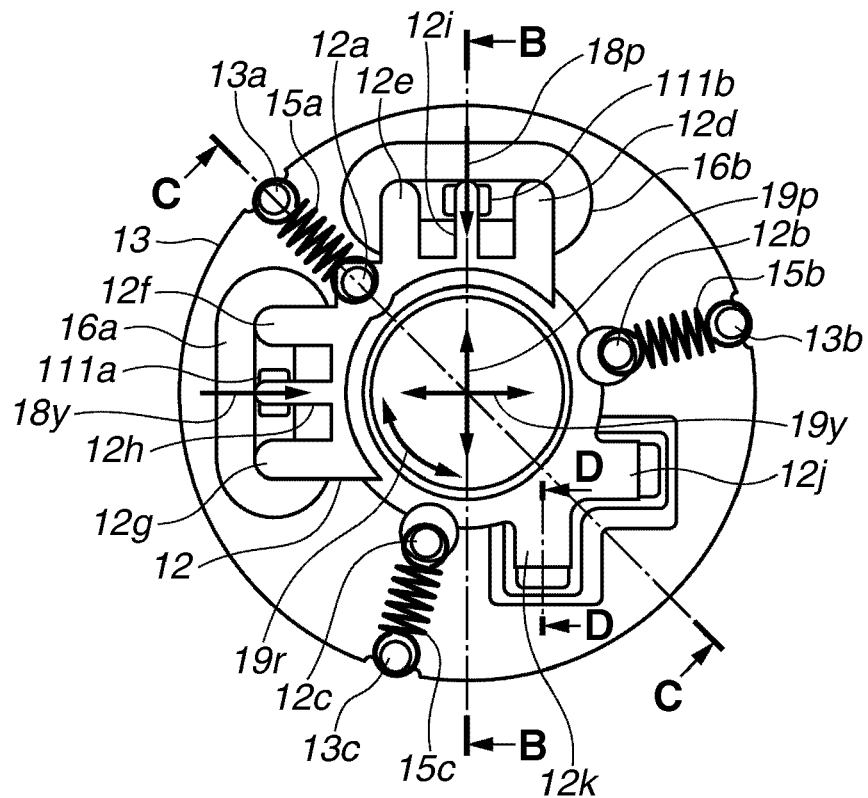
FIG. 2A illustrates a front view of an image blur correction apparatus according to the first exemplary embodiment of the present invention.
Figure 2B:
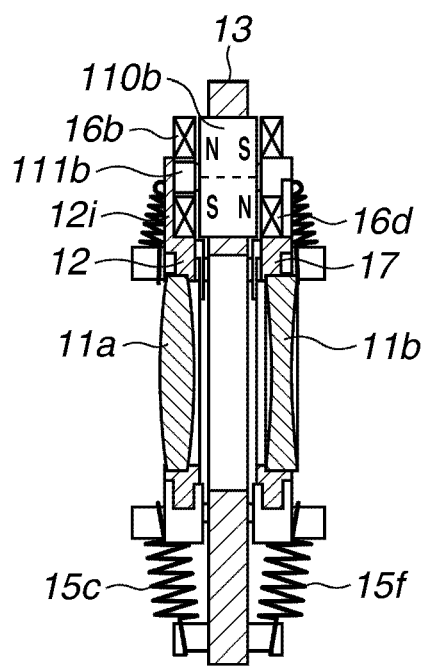
FIG. 2B illustrates a cross-sectional view of the image blur correction apparatus according to the first exemplary embodiment of the present invention, taken along a line B-B of FIG. 2A.
Figure 3A:
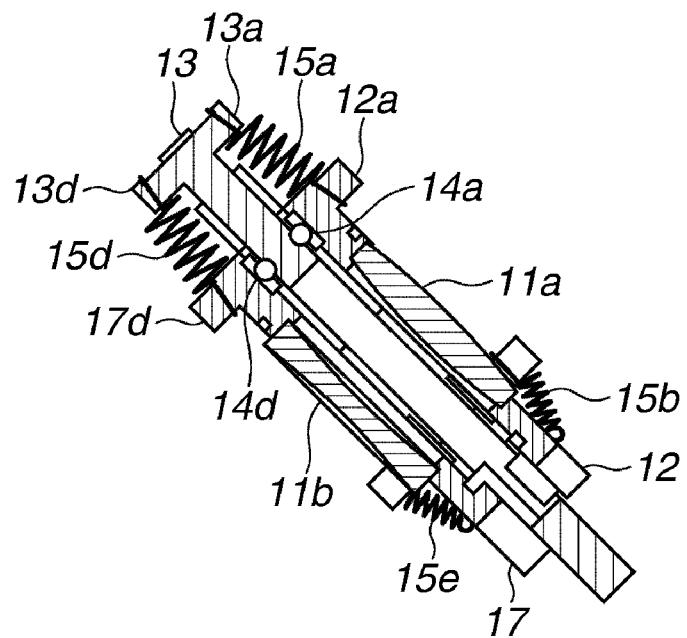
FIG. 3A illustrates a cross-sectional view of the image blur correction apparatus according to the first exemplary embodiment of the present invention, taken along a line C-C of FIG. 2A.
Figure 3B:
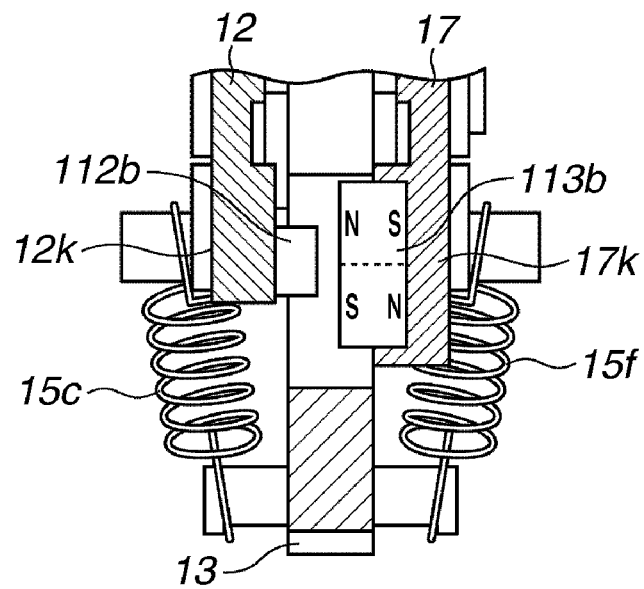
FIG. 3B illustrates a cross-sectional view of the image blur correction apparatus according to the first exemplary embodiment of the present invention, taken along a line D-D of FIG. 2A.

FIGS. 1 to 3 illustrate an example image blur correction apparatus equipped in the imaging apparatus (digital camera) according to the first exemplary embodiment of the present invention. More specifically, FIG. 1 is an exploded perspective view of the image blur correction apparatus. FIG. 2A illustrates a front view of the image blur correction apparatus illustrated in FIG. 1. FIG. 2B illustrates a cross-sectional view of the image blur correction apparatus illustrated in FIG. 1, taken along a line B-B of FIG. 2. FIG. 3A illustrates a cross-sectional view of the image blur correction apparatus illustrated in FIG. 1, taken along a line C-C of FIG. 2A. FIG. 3B illustrates a cross-sectional view of the image blur correction apparatus illustrated in FIG. 1, taken along a line D-D of FIG. 2A.

In FIGS. 1, 2A, 2B, 3A, and 3B, a correction lens 11*a* has a positive power and a correction lens 11*b* has a negative power. A holding frame 12 holds the correction lens 11*a*. A holding frame 17 holds the correction lens 11*b*.

The holding frame 12 includes pins 12*a*, 12*b*, and 12*c* (see FIG. 2A) disposed at angular intervals of 120 degrees. Ends of extension springs 15*a*, 15*b*, and 15*c* are hooked around the pins 12*a*, 12*b*, and 12*c*. A ground plate 13 includes pins 13*a*, 13*b*, 13*c* disposed at angular intervals of 120 degrees (see FIG. 2A) and 13*d* (See FIG. 3A) disposed at the opposite side of the ground plate 13 facing the pin 13*a*. The other ends of the extension springs 15*a*, 15*b*, 15*c* and 15*d* are hooked around the pins 13*a*, 13*b*, 13*c* and 13*d*. Namely, the extension springs 15*a*, 15*b*, and 15*c* are stretched between the pins 12*a* to 12*c* and the pins 13*a* to 13*c*, as illustrated in FIG. 2A. Similarly, the extension spring 15*d* is stretched between the pin 12*d* and 17*d* (see FIG. 3A).

As illustrated in FIG. 1, three balls 14*a*, 14*b*, and 14*c* are provided at predetermined portions on a reverse surface of the holding frame 12. The extension springs 15*a* to 15*c* (i.e., elastic means), which are obliquely hung as illustrated in FIG. 3A, resiliently urge the holding frame 12 toward the ground plate 13. As the balls 14*a* to 14*c* are provided between the holding frame 12 and the ground plate 13, the holding frame 12 can move in directions indicated by arrows 19*p*, 19*y*, and 19*r* (see FIG. 2A) relative to the ground plate 13. However, the balls 14*a* to 14*c* restrict a displacement of the holding frame 12 in the direction of an optical axis 57 (see FIG. 1).

Three extension springs 15*a* to 15*c* stretch the holding frame 12 in radial directions. As the resilient force is set to be a sufficiently large value, the extension springs 15*a* to 15*c* can prevent the holding frame 12 from rotating in the direction indicated by the arrow 19*r*. Regarding the directions indicated by the arrows 19*p* and 19*y*, the resilient forces of the extension springs 15*a* to 15*c* are cancelled with each other. Therefore, the holding frame 12 is movable in the directions indicated by arrows 19*p* and 19*y* when a relatively weak force is applied to the holding frame 12.

A coil 16*a* is bonded to two projected portions 12*f* and 12*g* of the holding frame 12. Another coil 16*b* is bonded to two projected portions 12*d* and 12*e* of the holding frame 12. As illustrated in FIG. 2B, two permanent magnets 110*a* and 110*b* (e.g., neodymium magnets) are provided on the ground plate 13 so as to protrude from its opposed surfaces. The permanent magnets 110*a* and 110*b* are magnetized in their thickness direction. The magnetic fluxes of the permanent magnets 110*a* and 110*b* penetrate the coils 16*a* and 16*b* in the optical axis direction, respectively.

Although not illustrated in FIGS. 1, 2A, and 2B, the coils 16*a* and 16*b* are sandwiched between yokes and the permanent magnets 110*a* and 110*b*. The coil 16*a* is disposed in a gap between one yoke and the permanent magnet 110*a*. The coil 16*b* is disposed in a gap between the other yoke and the permanent magnet 110*b*. Thus, the magnetic fluxes penetrating the coils 16*a* and 16*b* can be rectified and the driving efficiency can be improved.

As illustrated in FIGS. 2A and 2B, a sensor 111*a* is bonded to an eared portion 12*h* of the holding frame 12 and a sensor 111*b* is bonded to an eared portion 12*i* of the holding frame 12. When the sensors 111*a* and 111*b* are made of hall devices, the permanent magnets 110*a* and 110*b* (to be used for driving) can be used as position detection devices. More specifically, the sensors 111*a* and 111*b* and the permanent magnets 110*a* and 110*b* constitute a first position detection unit. The first position detection unit can measure an eccentric amount of a first driven portion (described below) relative to the ground plate 13 (stationary member).

The correction lens 11*a*, the holding frame 12, the coils 16*a* and 16*b*, the sensors 111*a* and 111*b*, and sensors 112*a* and 112*b* (described below) cooperatively constitute the first driven portion. The coils 16*a* and 16*b* (i.e., part of the first driven portion) and the permanent magnets 110*a* and 110*b* attached to the ground plate 13 cooperatively constitute a first driving portion.

As described above, the magnetic flux of the permanent magnet 110*a* penetrates the coil 16*a* perpendicularly. Accordingly, when current flows through the coil 16*a*, the holding frame 12 efficiently moves in the direction indicated by an arrow 18p (see FIG. 2A). Similarly, when current flows through the coil 16b, the holding frame 12 moves in the direction indicated by an arrow 18y (see FIG. 2A).

The movement amount of the holding frame 12 is substantially determined based on the constant of springs of the extension springs 15a to 15c acting in respective directions and the thrust force generated cased by an interaction between the coils 16a and 16b and the permanent magnets 110a and 110b. In other words, the eccentric amount of the correction lens 11a can be controlled based on the amount of current flowing through respective coils 16a and 16b.

The correction lens 11b having a negative power (which is different from that of the correction lens 11a) is provided on the behind side of the ground plate 13. The holding frame 17 holds the correction lens 11b. In arrangement, a portion including the correction lens 11b is similar to the first driven portion including the correction lens 11a.

More specifically, the correction lens 11b, the holding frame 17, and coils 16c and 16d constitute a second driven portion. Three extension springs 15d to 15f resiliently urge the second driven portion toward the ground plate 13 via balls 14d to 14f, although only the extension spring 15d and the ball 14f are illustrated in FIG. 3A.

Therefore, when current flows through the coils 16c and 16d, the correction lens 11b moves in the directions indicated by the arrows 19p and 19y (see FIG. 2B), although only the coil 16d is illustrated in FIG. 2B. The coils 16c and 16d (i.e., part of the second driven portion) and the permanent magnets 110a and 110b attached to the ground plate 13 cooperatively constitute a second driving portion. The permanent magnets 110a and 110b, serving as part of the first driving portion, can be used as common permanent magnets to be used for driving. Similar to the first driven portion, the extension springs 15d to 15f can prevent the second driven portion from rotating in the direction indicated by the arrow 19r.

As understood from FIGS. 2A, 2B, 3A, and 3B, the magnetic flux of the permanent magnets 110a and 110b provided on the ground plate 13 penetrate not only the coils 16a and 16b but also the coils 16c and 16d. More specifically, the permanent magnet 110a is a common magnet for the coils 16a and 16c and the permanent magnet 110b is a common magnet for the coils 16b and 16d. Therefore, a pair of magnets (permanent magnets 110a and 110b) can move the first driven portion and the second driven portion.

As illustrated in FIG. 3B, the sensor 112b (112a) is bonded to an eared portion 12k (12j) of the holding frame 12. A magnet 113b (113a) to be used for position detection is bonded to an eared portion 17k (17j) of the holding frame 17. The sensors 112a and 112b and the magnets 113a and 113b to be used for position detection cooperatively constitute a second position detection unit. The second position detection unit can measure an eccentric amount of the first driven portion relative to the second driven portion.

Figure 4:
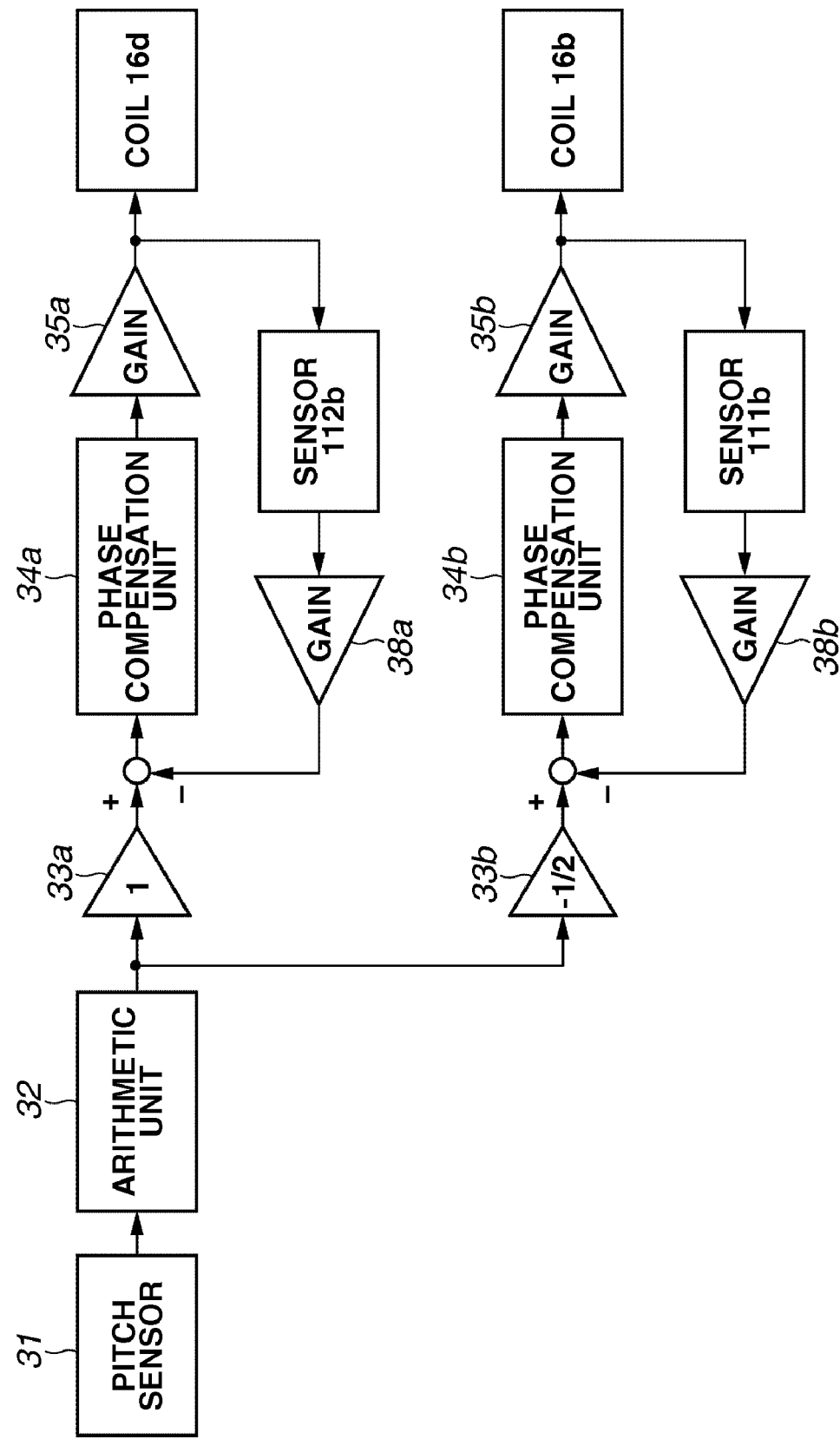
FIG. 4 is a block diagram illustrating a drive control system for the image blur correction apparatus according to the first exemplary embodiment of the present invention.

FIG. 4 is a block diagram illustrating a drive control system that controls a driving portion according to the first exemplary embodiment of the present invention. As the pitch control and the yaw control are similar to each other, example pitch direction control is described below.

In FIG. 4, a pitch sensor 31 is a sensor (gyro sensor) that is used to detect an amount of camera shake. An arithmetic unit 32 generates a target value in the pitch direction based on the result of integration/filtering of an output signal of the pitch sensor 31. The target value generated by the arithmetic unit 32 is a relative eccentric amount between the first driven portion and the second driven portion.

As described below, in an appropriate optical system, image blur correction can be performed by controlling a relative eccentric amount between the first driven portion and the second driven portion. In the present exemplary embodiment, when the generated target value has a positive value, the first driven portion moves in the negative direction and the second driven portion moves in the positive direction.

Two gain controllers 33a and 33b generate target values for the coils 16b and 16d, respectively. The gain controllers 33a and 33b perform feedback control for the coils 16b and 16d based on the output signals of respective sensors 111b and 112b. The position of the first driven portion relative to the stationary member and the position of the second driven portion relative to the first driven portion can be appropriately controlled by appropriately designing phase compensation units 34a and 34b and gains 35a, 35b, 38a, and 38b.

An example operation performed when the above-described drive control system is used and the pitch sensor 31 generates no output is described below. When the pitch sensor 31 generates no output, the arithmetic unit 32 receives no input. The gain controllers 33a and 33b receive no input. The sensor 111b measures an eccentric amount of the first driven portion relative to the ground plate 13 and controls the position of the coil 16b. Therefore, the first driven portion is controlled so as to reduce the output of the sensor 111b to zero.

As a result, the first driven portion is held at the center of the optical axis. The sensor 112b measures an eccentric amount of the first driven portion relative to the second driven portion and controls the position of the coil 16d. As the first driven portion is held at the center of the optical axis, the second driven portion is also held at the center of the optical axis.

When the output of the pitch sensor 31 is not 0, the gain controller 33b generates a target amount for driving the first driven portion that is equivalent to a half of the output of the arithmetic unit 32. The feedback control is performed based on the output of the sensor 111b. As a result, the first driven portion deviates from the optical axis by an amount corresponding to the target amount for driving the first driven portion.

On the other hand, the gain controller 33a generates a target amount for driving the second driven portion that is opposite in direction and double in amount compared to the target amount for driving the first driven portion. The sensor 112b detects an eccentric amount of the first driven portion relative to the second driven portion. Therefore, the first driven portion and the second driven portion are driven in opposite directions by the same amount.

Figure 5:
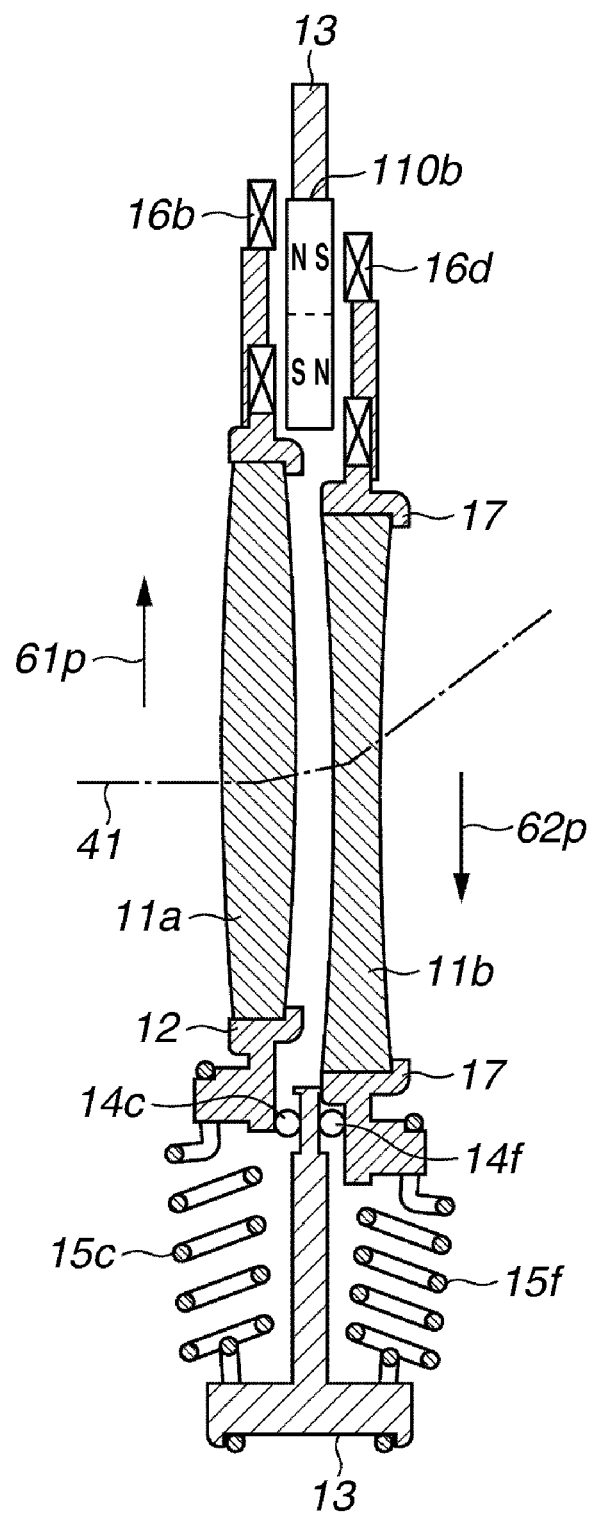
FIG. 5 is a cross-sectional view illustrating an image blur correcting operation performed by the image blur correction apparatus according to the first exemplary embodiment of the present invention.

FIG. 5 schematically illustrates an example state of the image blur correction performed by the image blur correction apparatus according to the present exemplary embodiment. FIG. 5 illustrates a movement of the image blur correction apparatus when the entire body of the apparatus rotates in the counterclockwise direction on the drawing surface. According to the above-described condition, the image blur correction is performed by deflecting the optical axis 41 upward on the drawing surface of FIG. 5, so as to suppress the movement of an image.

In FIG. 5, the correction lens 11a is driven in the direction indicated by an arrow 61p and the correction lens 11b is driven in the direction indicated by an arrow 62p. The eccentricity of the correction lens 11a (which is a convex lens) deflects the optical axis 41 upward in FIG. 5. On the other hand, the eccentricity of the correction lens 11b (which is a concave lens) deflects the optical axis 41 upward in FIG. 5. Namely, the deflections by two correction lenses 11a and 11b are mutually enhanced. Therefore, the optical axis 41 of the imaging optical system deflects greatly as illustrated in FIG. 5. In other word, a small drive amount can obtain a large deflection.

When the optical design is appropriate, a deflection amount of the optical axis 41 by the eccentricity of the correction lens 11a can be equalized with the deflection amount of the optical axis 41 by the eccentricity of the correction lens 11b although the deflection directions are opposite. In this case, the deflection amount of the optical axis can be controlled by controlling the relative position between the correction lens 11a and the correction lens 11b.

However, the positions of the correction lenses 11a and 11b are affected by the gravity. Values of the natural frequency determined by a composite spring constant of the extension springs 15a to 15c, and the positional deviation of the extension springs 15 can be set to be similar between the correction lenses 11a and 11b by setting the mass of the first driven portion including the correction lens 11a and the mass of the second driven portion including the correction lens 11b to be similar to each other.

Figure 6:
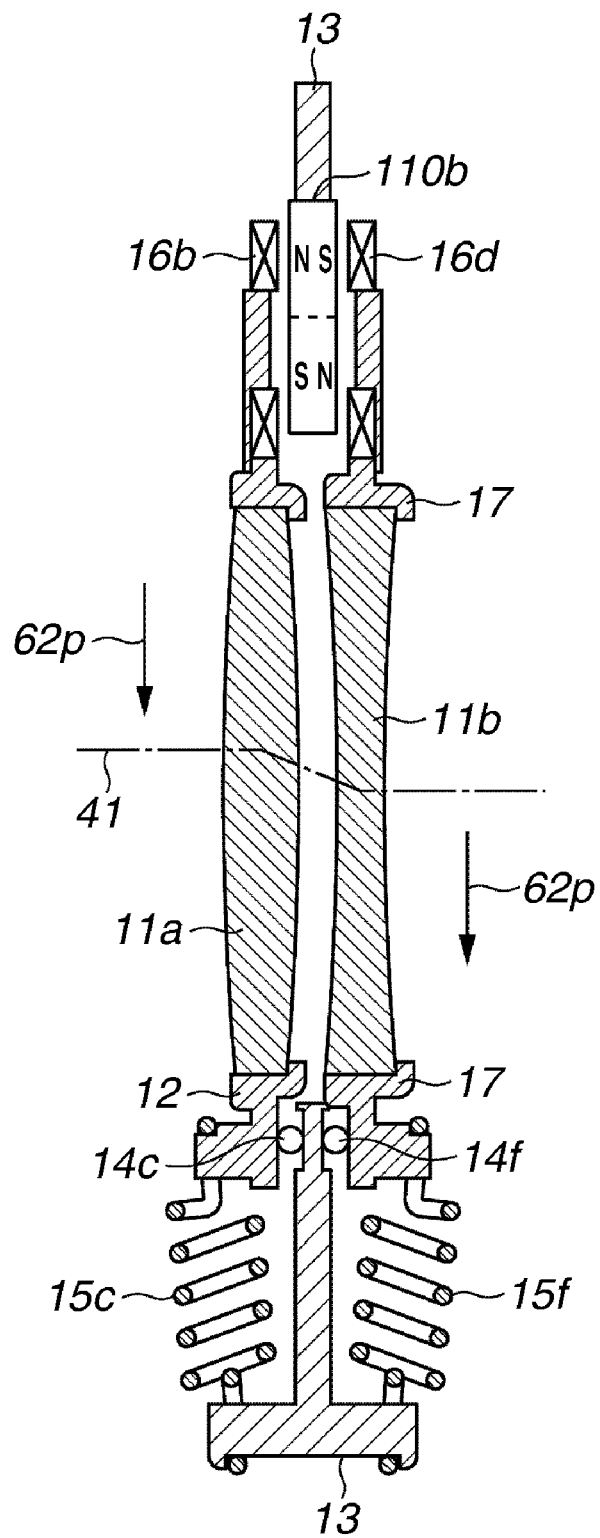
FIG. 6 is a cross-sectional view illustrating positional deviations caused by the gravity in the image blur correction apparatus according to the first exemplary embodiment of the present invention.

FIG. 6 schematically illustrates an example state of the correction lenses 11a and 11b, the positions of which are affected by the gravity without using the image blur correction function.

In this case, two correction lenses 11a and 11b have opposite powers. Therefore, the correction lenses 11a and 11b are driven in the direction indicated by the arrow 62p. Accordingly, the correction lens 11a can change the direction of the optical axis 41 of the imaging optical system. However, as the direction of the optical axis 41 is corrected by the correction lens 11b, the optical axis 41 does not change its direction although the optical axis 41 may slightly shift. Accordingly, the image-forming position does not change largely on an imaging plane.

In this manner, the present exemplary embodiment can increase the deflection of the optical axis 41 by driving the correction lenses 11a and 11b having opposite powers in mutually opposite directions. Further, the present exemplary embodiment can eliminate the positional deviation of the image-forming position relative to the imaging plane that is caused by the gravity.

Effects of the image blur correction apparatus according to the first exemplary embodiment are described with reference to FIG. 7.

As described with reference to FIGS. 5 and 6, in the image blur correction apparatus according to the first exemplary embodiment that uses two correction lenses 11a and 11b having different powers, the relative position between two correction lenses 11a and 11b influences the deflection of the optical axis.

Figure 7:
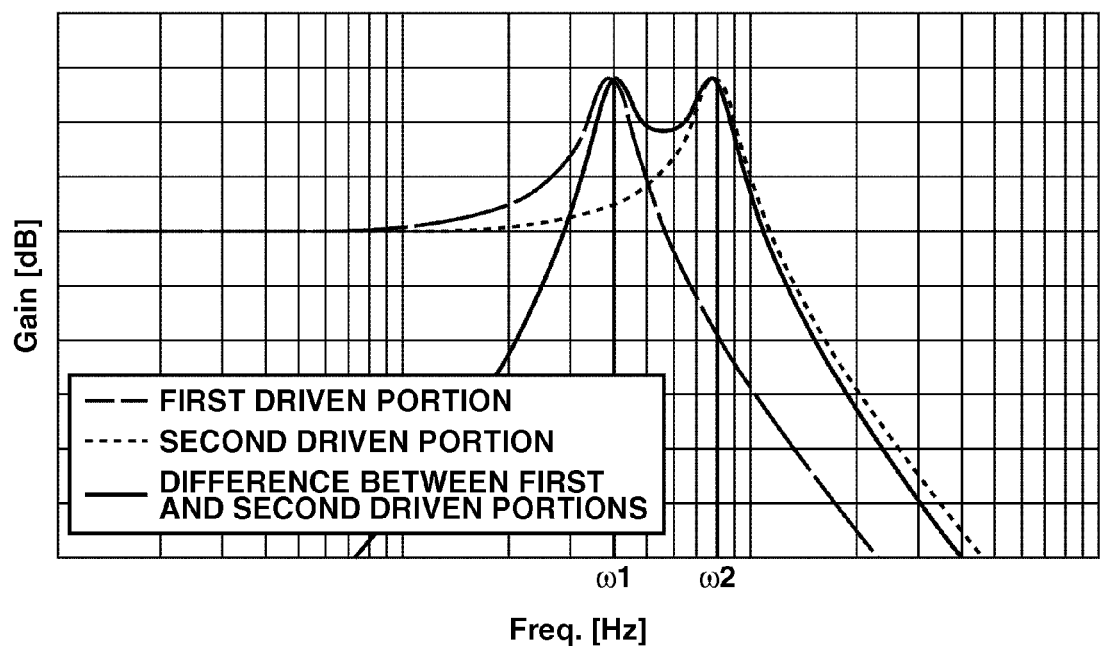
FIG. 7 is a graph illustrating frequency characteristics for controlling two correction lenses equipped in the image blur correction apparatus according to the first exemplary embodiment of the present invention.

FIG. 7 is a graph illustrating frequency characteristics (gain) in the positional control of the first driven portion and the second driven portion relative to the ground plate 13.

In FIG. 7, $\omega 1$ represents a resonance frequency of the first driven portion, and $\omega 2$ represents a resonance frequency of the second driven portion. The mass of each driven portion and a spring constant and a damping ratio of each extension spring determine the resonance frequency. However, the first exemplary embodiment uses two lenses mutually different in power (in other words, there is the possibility that two lenses are different in mass). Therefore, it is not easy to equalize the resonance frequency $\omega 1$ of the first driven portion with the resonance frequency $\omega 2$ of the second driven portion.

As is apparent from FIG. 7, it is difficult to accurately control a relative movement between the first driven portion and the second driven portion, having the resonance frequency $\omega 1$ and the resonance frequency $\omega 2$, respectively.

Therefore, inappropriate control may be performed if the vibration entered from the outside is in the frequency range between the resonance frequency $\omega 1$ and the resonance frequency $\omega 2$. Therefore, accurately deflecting the optical axis 41 is difficult. As a result, an image that is insufficient in the image blur correction may be formed.

Hence, the first exemplary embodiment controls the relative position between the first driven portion and the second driven portion by controlling the position of the first driven portion relative to the ground plate 13 (the stationary member). With the above-described mechanism and the drive control system, the first exemplary embodiment can secure accuracy in the control of the first driven portion and the second driven portion, and can appropriately perform the image blur correction.

With the above-described arrangement, the first exemplary embodiment can realize a compact image blur correction apparatus that can realize a large stroke in the image blur correction and can reduce the eccentric amount in the optical axis direction to be caused by the gravity. As a result, the first exemplary embodiment can downsize an imaging apparatus or an optical apparatus (e.g., an observation apparatus). The first exemplary embodiment can further suppress a positional deviation of the imaging plane that may be caused by the orientation of the imaging apparatus or the optical apparatus. Moreover, the first exemplary embodiment can obtain an image not including the effects caused by the image blur by appropriately controlling two correction lenses having different powers.

Figure 8:
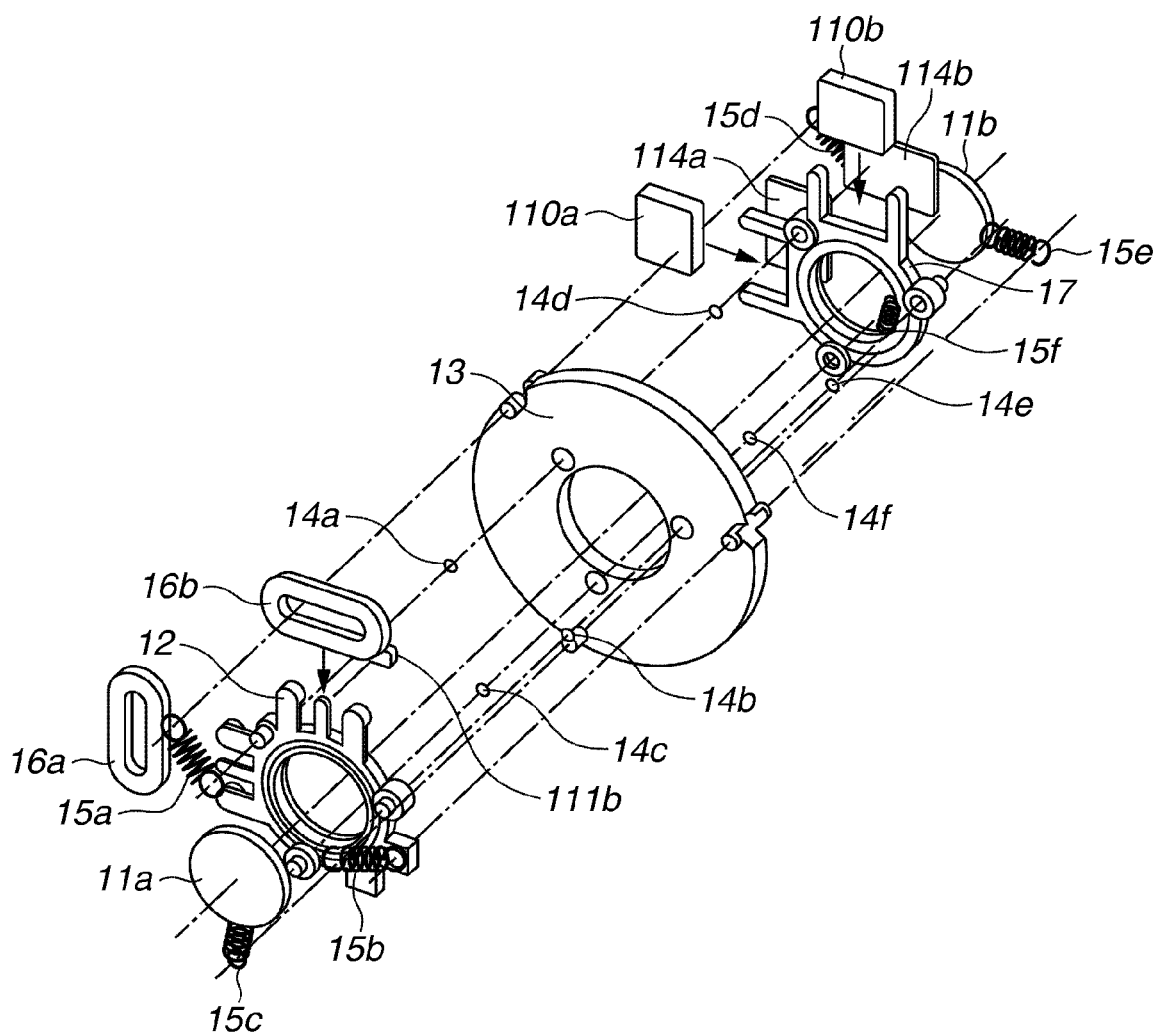
FIG. 8 illustrates an exploded perspective view of an image blur correction apparatus according to a second exemplary embodiment according to the present invention.
Figure 9A:
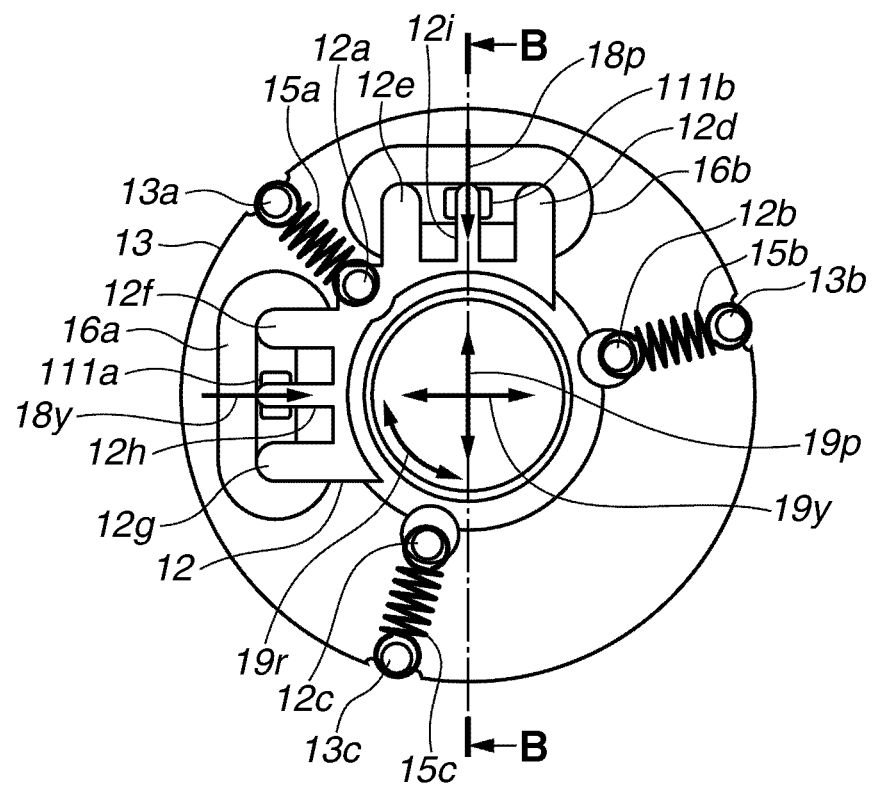
FIG. 9A illustrates a front view of the image blur correction apparatus according to the second exemplary embodiment of the present invention.
Figure 9B:
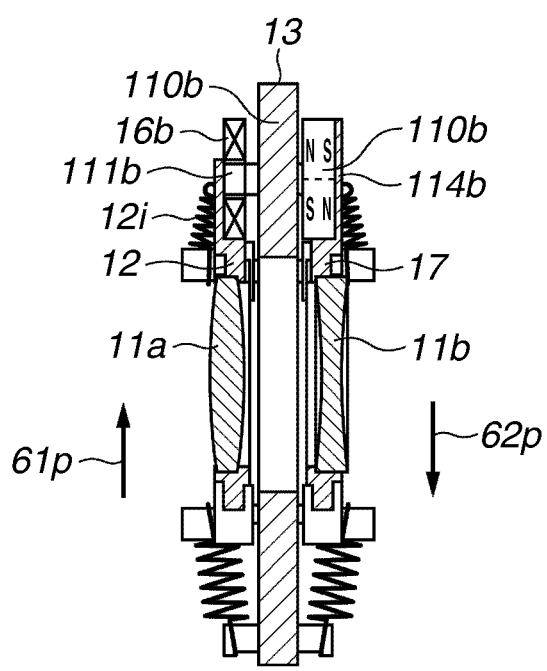
FIG. 9B illustrates a cross-sectional view of the image blur correction apparatus according to the second exemplary embodiment of the present invention, taken along a line B-B of FIG. 9A.

FIGS. 8, 9A and 9B illustrate an image blur correction apparatus equipped with a digital camera according to a second exemplary embodiment of the present invention. FIG. 8 illustrates an exploded perspective view of the image blur correction apparatus. FIG. 9A illustrates a front view of the image blur correction apparatus illustrated in FIG. 8. FIG. 9B illustrates a cross-sectional view illustrating the image blur correction apparatus taken along a line B-B of FIG. 9A.

Constituent components functionally similar to those illustrated in FIGS. 1 to 3 of the first exemplary embodiment are denoted by the same reference numerals and are not described below. The digital camera including the image blur correction function according to the second exemplary embodiment has an arrangement similar to that of the first exemplary embodiment illustrated in FIGS. 11 to 13.

The second exemplary embodiment is different from the first exemplary embodiment in the arrangement of the driving portion and a method for controlling the driving portion. According to the first exemplary embodiment, the coils 16a and 16b are provided on the holding frame 12 and the coils 16c and 16d are provided on the holding frame 17. The permanent magnets 110a and 110b are provided on the ground plate 13. The holding frames 12 and 17 are driven by an interaction of magnetic forces to be generated between the coils 16a to 16d and the magnets 110a and 110b.

On the other hand, in the second exemplary embodiment of the present invention, the coils 16a and 16b (although only the coil 16b is illustrated in FIG. 9B) are provided on the holding frame 12 and the permanent magnets 110a and 110b (although only the permanent magnet 110b is illustrated in FIG. 9B) are provided on the holding frame 17. The holding frame 12 and the holding frame 17 are driven when current flows through the coils 16a and 16b.

As the permanent magnet 110b is attracted by a yoke 114b and the yoke 114b is fixed to the holding frame 17, the permanent magnet 110b is firmly attached to the holding frame 17. Moreover, the permanent magnet 110b substantially increases the thickness of the yoke 114b and can enhance the coercive force. Further, as the permanent magnet 110a is attracted by a yoke 114a and the yoke 114a is fixed to the holding frame 17, the similar result can be obtained.

In FIG. 9B, as described above, when current flows through the coil 16b, the coil 16b is driven in the direction indicated by the arrow 61p under the interactive force acting between the permanent magnet 110b and the coil 16b. In this case, the permanent magnet 110b receives a reaction force from the coil 16b and is therefore driven in the direction indicated by the arrow 62p.

In this case, if the coils, the permanent magnets, the current values, and the spring constants are similar to those described in the first exemplary embodiment, a relative moving amount between the holding frame 12 and the holding frame 17 becomes a half of that in the first exemplary embodiment. However, the second exemplary embodiment does not require the coil (e.g., coil 16d in FIG. 2B) to be used to drive the second driven portion (holding frame 17) and therefore can reduce the size.

The sensors 111a and 111b are bonded to the eared portions 12h and 12i of the holding frame 12 respectively included in the first driven portion. The sensors 111a and 111b and the permanent magnets 110a and 110b cooperatively constitute a position detection unit. The position detection unit can measure an eccentric amount of the first driven portion relative to the second driven portion, as the permanent magnets 110a and 110b are fixed to the holding frame 17. The second exemplary embodiment is different from the first exemplary embodiment in this respect.

The second exemplary embodiment can control the relative position between two correction lenses 11a and 11b by controlling the current flowing through the coils 16a and 16b based on a signal output from the position detection unit. In this case, similar to the first exemplary embodiment, when the ratio of the mass to the spring constant is similar between the first driven portion and the second driven portion, the eccentricity in the optical axis caused by the gravity can be suppressed (because the correction lenses 11a and 11b deviate in the same direction by the same amount).

Although not described in detail, the second exemplary embodiment performs open control for controlling the position of the first driven portion relative to the ground plate 13.

As described above, the second exemplary embodiment can reduce the number of constituent components of an image blur correction apparatus and arrange the first driven portion and the second driven portion so as to be relatively movable. The second exemplary embodiment can reduce the thickness of the driving portion and can realize a compact image blur correction apparatus.

Figure 10:
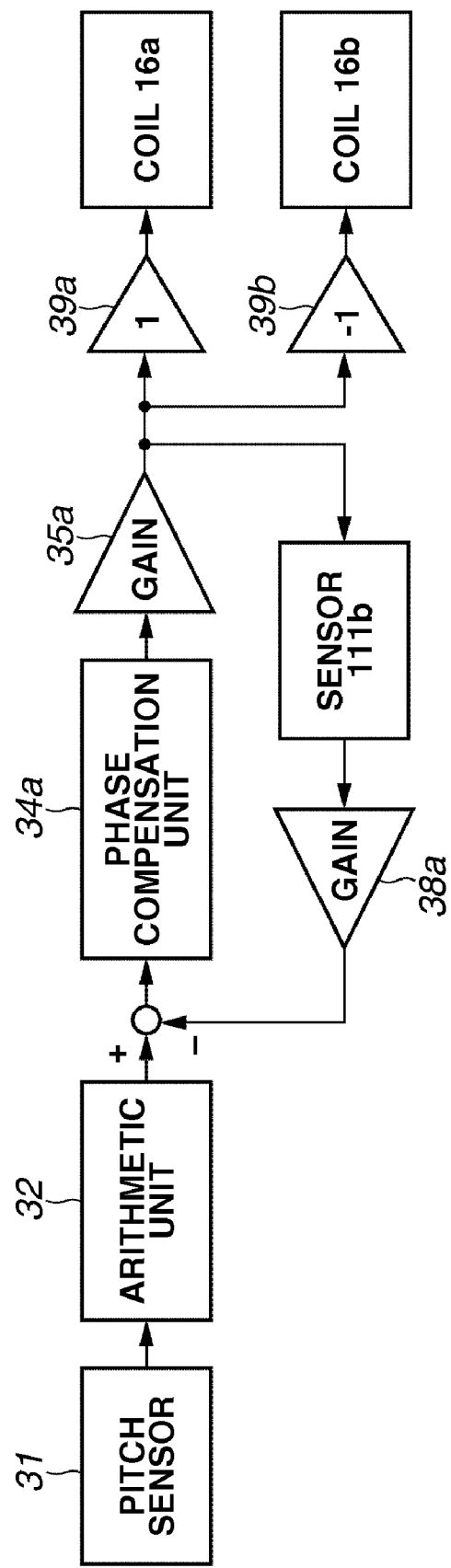
FIG. 10 is a block diagram illustrating a drive control system for the image blur correction apparatus according to the second exemplary embodiment of the present invention.

FIG. 10 is a block diagram of a drive control system according to the second exemplary embodiment of the present invention. As a pitch control method and a yaw control method are similar to each other, an example pitch control method is described below in detail.

In FIG. 10, a pitch sensor 31 is a sensor (gyro sensor) capable of detecting a shake amount. An arithmetic unit 32 generates a target value in the pitch direction by integrating/filtering an output signal of the pitch sensor 31. The target value generated by the arithmetic unit 32 is a relative eccentric amount between the first driven portion and the second driven portion. When the generated target value has a positive value, the first driven portion moves in the negative direction and the second driven portion moves in the positive direction.

Two gain controllers 39a and 39b generate target values for the coils 16b and 16d, respectively. The gain controllers 39a and 39b perform feedback control for the coils 16b and 16d based on outputs of the sensors 111a and 111b. The position of the second driven portion relative to the first driven portion can be appropriately controlled when a phase compensation unit 34a and two gains 35a and 38a are appropriately designed.

If the pitch sensor 31 generates no output, the signal entered to the arithmetic unit 32 is zero. According to the block diagram illustrated in FIG. 10, if the pitch sensor 31 generates no output, the output of the sensor 111b is at a position where the position of zero is stable. As the sensor 111b measures an eccentric amount of the first driven portion relative to the second driven portion, control is performed to decrease a relative eccentricity between the first driven portion and the second driven portion. As a result, even when two correction lenses deviate in the same direction, their eccentric amounts are similar with each other. This is the state similar to that described in the first exemplary embodiment that occurs due to gravity. Therefore, the eccentricity of the optical axis does not occur.

If the pitch sensor 31 generates an output, a value appropriately processed by the arithmetic unit 32 is output as a target value. An output of the sensor 111b is processed by the gain 38b and is controlled to be the above-described target value. If the value having been output from the sensor 111b and processed by the gain 38b is different from the target value, an appropriate value having passed through the phase compensation 34a and the gain 35a is supplied to the coil as a drive amount.

The values supplied from the gain controllers 39a and 39b to the coils 16b and 16d are similar in magnitude and opposite in direction. As a result, the first driven portion and the second driven portion deviate from their positions in the state where the pitch sensor 31 generates no output in the opposite directions by the similar amounts. The sensor 111b detects a resultant eccentricity amount. The drive amounts of the first driven portion and the second driven portion are successively updated to move and settle them in a balanced positional relationship.

When the above-described driving control is performed, the first driven portion and the second driven portion can be driven in mutually opposite directions by the same amount according to the output of the pitch sensor 31. The driving portion according to the second exemplary embodiment includes the coils 16a and 16b provided on the first driven portion and the magnets 110a and 110b provided on the second driven portion. The first driven portion and the second driven portion are driven in mutually opposite directions by an interactive force generated when current flows through the coils 16a and 16b. Accordingly, the image blur correction apparatus can be downsized.

The example described in the above-described exemplary embodiments is the image blur correction apparatus equipped in a digital camera. However, another exemplary embodiment of the present invention may be embodied as a compact and stable unit. Therefore, the present invention is not limited to the digital camera and can be applied to any other imaging apparatus, such as a digital video camera, a monitoring camera, or a web camera. The present invention is further applicable to a portable terminal, such as binoculars or a portable telephone, and is also usable for aberration correction in a polarizing apparatus or an optical axis rotating apparatus incorporated in a stepper or other optical apparatus.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures, and functions.

This application claims priority from Japanese Patent Application No. 2008-107319 filed Apr. 16, 2008, which is hereby incorporated by reference herein in its entirety.

What is claimed is:

1. An image blur correction apparatus comprising:
a first lens unit including a first correction lens;
a second lens unit including a second correction lens having a power opposite to that of the first correction lens;
a supporting unit configured to align the first lens unit and the second lens unit in a direction of an optical axis, so that the first lens unit and the second lens unit can independently move in a direction perpendicular to the optical axis;
a driving unit configured to drive the first lens unit and the second lens unit;
a first position detection unit configured to detect the position of the first lens unit relative to the supporting unit;
a second position detection unit configured to detect the position of the second lens unit relative to the first lens unit;
a shake detection unit configured to detect a shake amount added to the image blur correction apparatus; and
a control unit configured to control the driving unit based on an output of the shake detection unit,
wherein the control unit is configured to control the first lens unit and the second lens unit so that the first lens unit moves based on an output of the first position detection unit and the second lens unit moves in a direction opposite to a moving direction of the first lens unit based on an output of the second position detection unit.

2. The image blur correction apparatus according to claim 1, wherein the driving unit includes a magnet attached to the supporting unit, a first coil attached to the first lens unit and located opposite the magnet, and a second coil attached to the second lens unit and located opposite the magnet, and the driving unit is configured to drive the first lens unit and the second lens unit in mutually opposite directions using an interactive force generated when current flows through the first coil and the second coil in opposite directions.

3. The image blur correction apparatus according to claim 1, wherein the control unit is configured to perform feedback control based on the output of the shake detection unit so that the first lens unit moves based on the output of the first position detection unit and perform feedback control so that the second lens unit moves in a direction opposite to a moving direction of the first lens unit based on the output of the second position detection unit.

4. An imaging apparatus including the image blur correction apparatus according to claim 1.

5. An optical apparatus including the image blur correction apparatus according to claim 1.

6. An image blur correction apparatus comprising:
a first lens unit including a first correction lens;
a second lens unit including a second correction lens having a power opposite to that of the first correction lens;
a supporting unit configured to support the first lens unit and the second lens unit so as to be movable perpendicular to an optical axis;
a driving unit configured to drive the first lens unit and the second lens unit;
a first position detection unit configured to detect the position of the first lens unit relative to the supporting unit;
a second position detection unit configured to detect the position of the second lens unit relative to the first lens unit;
a shake detection unit configured to detect a shake amount added to the image blur correction apparatus; and
a control unit configured to control the driving unit based on an output of the shake detection unit,
wherein the control unit is configured to control so that the first lens unit moves based on an output of the first position detection unit and control so that the second lens unit moves in a direction opposite to a moving direction of the first lens unit based on an output of the second position detection unit.

7. The image blur correction apparatus according to claim 6, wherein the driving unit includes a magnet attached to the supporting unit, a first coil attached to the first lens unit and located opposite the magnet, and a second coil attached to the second lens unit and located opposite the magnet, and the driving unit is configured to drive the first lens unit and the second lens unit in mutually opposite directions using an interactive force generated when current flows through the first coil and the second coil in opposite directions.

8. The image blur correction apparatus according to claim 6, wherein the control unit is configured to perform feedback control based on the output of the shake detection unit so that the first lens unit moves based on the output of the first position detection unit and the second lens unit moves in a direction opposite to the moving direction of the first lens unit based on the output of the second position detection unit.

9. An imaging apparatus including the image blur correction apparatus according to claim 6.

10. An optical apparatus including the image blur correction apparatus according to claim 6.

* * * * *